United States Patent

Woracek et al.

[11] Patent Number: 5,288,303
[45] Date of Patent: Feb. 22, 1994

[54] FLUE GAS CONDITIONING SYSTEM

[75] Inventors: David L. Woracek, Federal Way, Wash.; Robert A. Wright, Indianapolis, Ind.

[73] Assignee: Wilhelm Environmental Technologies, Inc., Indianapolis, Ind.

[21] Appl. No.: 864,847

[22] Filed: Apr. 7, 1992

[51] Int. Cl.$^5$ .............................. B03C 3/01; B03C 3/68
[52] U.S. Cl. .............................................. 95/2; 95/6; 96/18; 96/22; 423/533
[58] Field of Search ............... 423/522, 244.09, 244.1, 423/533; 55/5, 106, 134; 422/160, 171, 169, 177, 178, 180, 211; 95/2, 6; 96/18, 22

[56] References Cited

U.S. PATENT DOCUMENTS

| | | | |
|---|---|---|---|
| 1,441,713 | 1/1923 | Prosser | 55/5 |
| 1,909,825 | 5/1933 | Hahn et al. | 55/4 |
| 2,602,734 | 7/1952 | Hedberg et al. | 75/1 |
| 2,864,456 | 12/1958 | Hall et al. | 183/7 |
| 3,284,990 | 11/1966 | Orne | 55/5 |
| 3,363,398 | 1/1968 | Wheatcroft et al. | 55/5 |
| 3,424,560 | 1/1969 | Carmassi et al. | 423/567 R |
| 3,523,407 | 8/1970 | Humbert | 55/106 |
| 3,568,403 | 3/1971 | Richardson | 55/5 |
| 3,581,463 | 6/1971 | Roberts | 55/5 |
| 3,607,034 | 9/1971 | Henry et al. | 423/522 |
| 3,665,676 | 5/1972 | McKewen | 55/4 |
| 3,686,825 | 8/1972 | Busby | 55/5 |
| 3,689,213 | 9/1972 | Guerrieri | 55/5 |
| 3,704,569 | 12/1972 | Hardison et al. | 55/4 |
| 3,719,471 | 3/1973 | Jones | 75/65 |
| 3,722,178 | 3/1973 | Aaland et al. | 55/4 |
| 3,818,682 | 6/1974 | Farrow et al. | 55/106 |
| 3,893,828 | 7/1975 | Archer | 55/104 |
| 3,966,436 | 6/1976 | Archer | 55/147 |
| 3,993,429 | 11/1976 | Archer | 431/5 |
| 4,035,165 | 7/1977 | Archer | 55/13 |
| 4,042,348 | 8/1977 | Bennett et al. | 55/5 |
| 4,058,372 | 11/1977 | DeLaMater | 55/5 |
| 4,205,630 | 6/1980 | Regan | 122/1 R |
| 4,208,192 | 6/1980 | Quigley et al. | 55/5 |
| 4,223,640 | 9/1980 | Rochford et al. | 122/1 R |
| 4,284,417 | 8/1981 | Reese et al. | 55/2 |
| 4,305,909 | 12/1981 | Willett et al. | 422/169 |
| 4,333,746 | 6/1982 | Southam | 55/106 |
| 4,390,831 | 6/1983 | Byrd et al. | 323/240 |
| 4,466,815 | 8/1984 | Southam | 55/122 |
| 4,533,364 | 8/1985 | Altman et al. | 55/5 |
| 4,548,789 | 10/1985 | Ballestra | 422/160 |
| 4,624,685 | 11/1986 | Lueckenotte et al. | 55/13 |
| 4,770,674 | 9/1988 | Tellini et al. | 55/5 |
| 4,779,207 | 10/1988 | Woracek et al. | 364/500 |
| 4,844,723 | 7/1989 | Tellini et al. | 55/106 |
| 4,931,265 | 6/1990 | Leussler | 423/244 |
| 4,966,610 | 10/1990 | Krigmont et al. | 55/5 |
| 4,987,839 | 1/1991 | Krigmont et al. | 110/216 |
| 5,008,628 | 4/1991 | Krigmont et al. | 324/693 |
| 5,011,516 | 4/1991 | Altman et al. | 55/5 |
| 5,024,171 | 6/1991 | Krigmont et al. | 110/345 |
| 5,029,535 | 7/1991 | Krigmont et al. | 110/345 |
| 5,032,154 | 7/1991 | Wright | 55/106 |

FOREIGN PATENT DOCUMENTS

| | | |
|---|---|---|
| 639992 | 5/1964 | Belgium . |
| 888086 | 12/1971 | Canada . |
| 1178025 | 11/1984 | Canada . |
| 2809199 | 9/1979 | Fed. Rep. of Germany . |
| 3108709 | 9/1982 | Fed. Rep. of Germany . |
| 3109847 | 9/1982 | Fed. Rep. of Germany . |
| 4513927 | 5/1970 | Japan . |
| 1093617 | 12/1967 | United Kingdom . |
| 1406109 | 9/1975 | United Kingdom . |

*Primary Examiner*—Gary P. Straub
*Attorney, Agent, or Firm*—Willian Brinks Hofer Gilson & Lione

[57] ABSTRACT

A flue gas conditioning system features a self-contained sulfur burner control loop that operates to maintain a constant desired temperature supply of sulfur dioxide in air by varying the rate of supply of sulfur fuel to the sulfur burner, and the absence of device in the sulfur flow path to measure or monitor sulfur flow rate. In the system, a conditioning agent demand signal operates either a means to supply the sulfur burner with a flow of air, or an air heater in the air flow path upstream of the sulfur burner, or both, to provide conditions that would increase or decrease the temperature of the sulfur burner output absent the self-contained sulfur burner control loop, and as a result of the operation of the self-contained sulfur burner control loop, systems of the invention can provide a demanded flow of sulfur dioxide and air at a substantially constant concentration and a desired temperature to a catalytic converter in response to a conditioning agent demand signal.

32 Claims, 5 Drawing Sheets

FLUE GAS CONDITIONING SYSTEM

BACKGROUND OF THE INVENTION

This invention relates to a system for treating particulate ladened boiler flue gas with a conditioning agent to improve the removal of particulate matter by electrostatic means and, more particularly, relates to an $SO_3$ flue gas-conditioning system which operates automatically to provide an effective flow of $SO_3$ conditioning agent and to control the catalytic converter temperature while meeting a system demand for $SO_3$.

The increasing demand for electrical power has forced electrical utilities to burn increasing quantities of fossil fuels. However, electric utilities face increasing environmental standards that are imposed upon their operation. In trying to satisfy the divergent demands of increasing power and decreased air pollution, electrical utilities have turned to burning low-sulfur coals, i.e., coals having less than one percent sulfur content, to fire their boilers and generate the steam needed for electrical power generation.

Electrostatic means such as electrostatic precipitators have long been used by electrical utilities to remove particulate matter such as fly ash from boiler flue gas. The efficiency of operation of the electrostatic precipitators in the removal of particulate matter from boiler flue gas is dependent, in part, upon the electrical resistivity of the entrained particulate matter in the boiler flue gas. The entrained particulate matter in the boiler flue gas expelled from a boiler fired with low-sulfur coal has been found to have a high resistivity, for example, $10^{13}$ ohm-cm resistance and more. It has also been determined that the efficient removal of particulate matter by electrostatic precipitation occurs when its resistivity is on the order of about $10^8$ ohm-cm and that when the resistivity of the particulate matter is higher, for example, on the order of $10^{13}$ ohm-cm, the efficiency of electrostatic precipitation is substantially reduced. Thus, reduced efficiency in the operation of electrostatic precipitators with the flue gas from low-sulfur coals has been attributed to the higher resistivity of such flue gas particles. Any reduction of the ability of an electrostatic precipitator to remove particles from the flue gas can offset, of course, the reduced or potentially reduced air pollution sought through the use of the more expensive low-sulfur coals.

The efficiency of an electrostatic precipitator in the removal of particulate matter from boiler flue gas can be increased by introducing a conditioning agent in the boiler flue gas prior to its entrance into the electrostatic precipitator to reduce the resistivity of the entrained particles within the boiler flue gas. Various chemicals, such as water, anhydrous ammonia and various ammonia-bearing solutions, sulfuric acid, sulfur trioxide and phosphoric acid, have been used as conditioning agents for boiler flue gas.

U.S. Pat. No. 3,284,990 discloses a method of improving the electrostatic precipitation of particles by adding phosphorous pentoxide to the particles prior to their electrostatic precipitation.

U.S. Pat. No. 3,523,407 discloses a method of improving the electrostatic precipitation of particles from a flue gas by adding preselected amounts of ammonia and water to the flue gas.

U.S. Pat. No. 3,665,676 discloses a system to condition the particles of boiler flue gas by the use of a salt solution such as a solution of ammonium sulfate or ammonium bisulfate. The salt solution is injected into the flue gas prior to entering the electrostatic precipitator and the system includes a metering means for controlling the amount of conditioner injected into the flue gas. U.S. Pat. No. 3,665,676 indicates that, if desired, conventional automatic controls can be provided to open the metering means when the flue gas reaches the desired operating temperature or to close it should the temperature fall below operating temperature. In addition, automatic controls can also be made to open the metering means to provide the amount of conditioner needed in proportion to the volume of gas to be conditioned.

U.S. Pat. No. 3,689,213 discloses a process for treating flue gas in which gaseous sulfur trioxide is generated in the immediate vicinity of the point of use as required by the quantity of fossil fuel being burned per unit time and is then introduced into the flue gas at a predetermined rate to facilitate fly ash removal by an electrostatic precipitator. In the system of U.S. Pat. No. 3,689,213, air and gaseous sulfur dioxide are heated in a heat exchanger to a temperature required for oxidation of sulfur dioxide to sulfur trioxide. The air and sulfur dioxide are passed through a catalytic converter for conversion of the sulfur dioxide to sulfur trioxide prior to its injection into the boiler flue gas.

U.S. Pat. No. 3,772,178 discloses a system for the production of sulfur trioxide for flue gas conditioning including means to deliver a source of sulfur such as sulfuric acid to a vaporizer in proportion to the amount of flue gas from the boiler measured in terms of the electrical output generated at a particular time. As the production of flue gas changes in the boiler system, the proper ratio of acid to flue gas is automatically maintained by a control responsive to a signal coming from a boiler capacity index gauge to control the volume of sulfur trioxide being produced. The vaporizer is provided with a mixture of fresh air and a combustion gas from a natural gas or oil to convert the sulfuric acid to sulfur trioxide. The amount of combustion gas directed into the combustion chamber is automatically controlled by the temperature of the sulfur trioxide as indicated by temperature controllers mounted at the top and bottom of the vaporizer in the path of the output gas. The temperature controllers maintain the temperature of the vaporizer in the range for efficient production of sulfur trioxide. An additional temperature controller at the exit of the vaporizer turns off the burner when the temperature at the exit exceeds 1200° F. (649° C.).

Developments in flue gas conditioning systems have more recently focused on sulfur trioxide ($SO_3$) as a flue gas-conditioning material. These flue gas-conditioning systems have included systems which store liquified sulfur which is supplied to a sulfur burner in which the sulfur is converted by combustion predominantly to sulfur dioxide. The systems then pass the sulfur dioxide to a catalytic converter which employs a vanadium pentoxide catalyst to convert the sulfur dioxide into sulfur trioxide. The sulfur trioxide created by such systems is piped to a nozzle system for injection into ducts carrying the boiler flue gas and its entrained particulate material to reduce the electrical resistivity of the flue gas particulate matter for removal by an electrostatic precipitator.

Several prior systems have been disclosed to control such $SO_3$ flue gas-conditioning systems. Such a system is disclosed, for example, in U.S. Pat. No. 3,993,429. In the system of U.S. Pat. No. 3,993,429 and in commercial systems resulting from this patent, a flow of heated air is forced into the sulfur burner; the temperature of the gas leaving the sulfur burner is sensed; and the sensed output temperature of the sulfur burner is used to control either the temperature of a flow of air forced into the sulfur burner, or the portion of a flow of heated air that is forced into the sulfur burner. The system of U.S. Pat. No. 3,993,429 increases or decreases the temperature of the air directed into the sulfur burner, or the portion of the heated air directed into the sulfur burner, in the event the burner outlet temperature is too low or too high, respectively. The system of U.S. Pat. No. 3,993,429 thus attempts to regulate the operating temperature of the sulfur burner and the catalytic converter downstream of the sulfur burner by regulating an air heater or an air flow diverter valve, or both, upstream of the sulfur burner.

U.S. Pat. No. 3,993,429 also discloses a system in which the temperature of operation of the catalytic converter is controlled by providing a second flow of air to be mixed with the output of the sulfur burner, detecting the temperature of the mixture of the second flow of air and the gases leaving the sulfur burner and varying the temperature of the air in the second flow of air to maintain a desired operating temperature for the catalytic converter. U.S. Pat. No. 3,993,429 further discloses that $SO_3$ flue gas conditioning systems can operate by sensing the rate of coal combustion and varying the rate of flow of sulfur into a sulfur burner in response to the rate of coal combustion.

U.S. Pat. No. 4,770,674 discloses a system for conditioning flue gas for an electrostatic precipitator, including equipment for converting sulfur into sulfur trioxide. The disclosed systems of U.S. Pat. No. 4,770,674 include a sulfur burner to produce oxidized sulfur, a catalytic converter to convert the oxidized sulfur to sulfur trioxide, and means to control sulfur and air inputs to the sulfur burner. Various inputs to the control means are disclosed, including the outlet temperature of the catalytic converter and such operating parameters of the exhaust stage of the system as the output temperature of the exhaust gas from the precipitator, the flow rate of the exhaust gas, the power delivered to or the speed of, an induced draft fan, if any, the opacity of the exhaust gas within the stack, and the power dissipated by the precipitator.

U.S. Pat. No. 4,779,207 discloses a system for preconditioning flue gas for electrostatic precipitation. The system of U.S. Pat. No. 4,779,207 includes a source of an $SO_3$ conditioning agent, a means for controllably adding the conditioning agent to the flue gas, a means for detecting the input power level of the electrostatic precipitators and control means for monitoring the input power level and controlling the amount of conditioning agent added to the gas to substantially maintain input power to the electrostatic precipitator to predetermined levels.

A controller commercially available from Castlet (Electronic Engineers) Ltd., of 14 Crofton Drive, Lincoln, England, can control an electrostatic precipitator by detecting the presence of deleterious back ionization and intermittently applying voltage to the charging electrodes of the precipitator to minimize back ionization. The Castlet controller detects back ionization by interrupting the applied charging voltage at its peak value and comparing, after a preset time, the actual charging electrode voltage with a programmed charging electrode voltage to identify excess charging electrode decay rate indicative of back ionization. The Castlet controller uses the difference in actual and programmed charging electrode voltage to determine a rate of application of voltage to the charging electrodes in an effort to optimize precipitator operation in the presence of conditions of back ionization.

U.S. Pat. No. 5,032,154 discloses, among other things, a system which provides direct, automatic control of the opacity of the effluent of a coal-fired boiler to maintain minimal opacity of the flue gas effluent passing from the boiler into the atmosphere. Systems of U.S. Pat. No. 5,032,154 provide a controlled flow of an agent, such as sulfur trioxide, to the boiler flue gas to condition its particulate matter for removal by electrostatic means, monitor precipitator power, and the opacity of the boiler flue gas after it leaves the electrostatic particle-removal means, and vary the controlled flow of conditioning agent to hunt and operate at conditioning agent flow rates determined from flue gas opacity alone or combined with precipitator power.

Other conditioning systems are shown, for example, in U.S. Pat. Nos. 3,686,825; 4,042,348; 4,284,417; 4,466,815; 4,533,364; and 4,624,685.

SUMMARY OF THE INVENTION

The present invention includes methods and apparatus for conditioning flue gas with sulfur trioxide for removal of entrained particles with an electrostatic precipitator. Systems of the invention feature a self-contained sulfur burner control loop that operates to maintain a constant desired temperature supply of sulfur dioxide in air by varying the rate of supply of sulfur fuel to the sulfur burner and the absence of a device in the sulfur flow path to measure or monitor sulfur flow rate. In systems of the invention, a conditioning agent demand signal operates either a means to supply the sulfur burner with a flow of air, or an air heater in the air flow path upstream of the sulfur burner, or both, to provide conditions that would lower or raise the temperature of the sulfur burner output absent the self-contained sulfur burner control loop, and as a result of the operation of the self-contained sulfur burner control loop systems of the invention provide a desired flow of sulfur dioxide and air at a constant desired temperature to a catalytic converter for conversion to sulfur trioxide in response to a conditioning agent demand signal.

Systems of the invention comprise first means for providing flows of sulfur dioxide in air at a desired temperature, which include at least a sulfur burner, means for providing said sulfur burner with a flow of air, means for providing said sulfur burner with a flow of sulfur, temperature sensor means for maintaining the desired temperature for said flows of sulfur dioxide in air, and a control for said means for providing said sulfur burner with a flow of sulfur that responds to said temperature sensor means to provide said flows of sulfur dioxide in air at the desired temperature to a catalytic converter for conversion to a flow of sulfur trioxide conditioning agent. In addition, in such systems of the invention, a sulfur trioxide demand input means provides a signal corresponding to a demand for sulfur trioxide to a system controller, and the system controller is connected with the means for providing the sulfur burner with a flow of air and is programmed to operate the means for providing the sulfur burner with a flow of air to vary the air flow into the sulfur burner in response to the sulfur trioxide demand input signal and, through the action of the first means, meet the sulfur trioxide demand.

Systems of the invention can further comprise means for heating the flow of air to the sulfur burner, means for bypassing a portion of the air flow around the sulfur burner, means for heating the portion of the air flow bypassing the sulfur burner and means for directing heated bypass air into the flow of sulfur trioxide conditioning agent and/or directing the heated bypass air through the catalytic converter. In such further systems of the invention, the sulfur trioxide demand input signal can be used by the system controller to vary the heat added to the flow of air to the sulfur burner and the heat added to the bypass air, either alone or in combination with variation of the air flow through the sulfur burner. In such further systems, the air heaters in the flow path to the sulfur burner may be operated only to preheat the sulfur burner, and the air heater in the flow path of the bypass air may be operated only to preheat the catalytic converter and to keep the flow of sulfur trioxide and air from the catalytic converter to the injection site above the condensation temperature.

In a preferred embodiment of the invention, the conditioning agent flow is controlled by a sulfur trioxide demand signal generated from a rate of discharge of a charged electrode of the electrostatic precipitator. It has been discovered that the rate of electrode discharge, such as the voltage decay of a charged electrode, can be used to indicate when conditioning agent will be needed and to provide an effective flow of conditioning agent to improve removal of entrained particulate matter from a boiler flue gas, and to preclude a wasteful flow of conditioning agent when it is not needed.

Such preferred embodiments of the invention include signal means connected with the electrostatic precipitator for sensing a voltage discharge rate of an electrostatic precipitator charging electrode and generating a conditioning agent demand signal, for use by the controller in producing a flow of conditioning agent. In one embodiment of the invention, the signal means for generating a conditioning agent demand signal can include a voltage sensing circuit connected with the charging electrode to provide a voltage decay rate signal, and can further provide rate-of-change circuit means to generate the conditioning agent demand signal. The signal means can generate a conditioning agent demand signal by comparing a charging electrode decay rate signal with a pre-programmed decay rate, for example, by comparing after a programmed time, a voltage proportional to the voltage of a charging electrode with a programmed voltage.

In a preferred method of the invention, air is supplied through a sulfur burner heater to pre-heat a sulfur burner to the combustion temperature of sulfur. A flow of liquid sulfur is initiated to said sulfur burner in proportion to a sulfur trioxide demand signal to provide a flow of sulfur dioxide to a catalytic converter for conversion to sulfur trioxide. The sulfur burner heater is de-energized, and thereafter air flow through the sulfur burner is adjusted in response to the sulfur trioxide demand, and the sulfur flow adjusts to maintain a satisfactory operating temperature in said catalytic converter.

In another method of this invention, air is supplied through the sulfur burner heater to preheat the sulfur burner to the combustion temperature of sulfur and air is also supplied through a catalytic converter air heater to preheat the catalytic converter to a temperature range of between 750° F. and 1000° F. A flow of liquid sulfur is initiated to the sulfur burner in proportion to a sulfur trioxide demand signal. The preheating air flow from the catalytic converter air heater is diverted around the catalytic converter, upon initiation of sulfur flow, and the diverted air is mixed with the $SO_3$-air mixture at the output of the catalytic converter. Either air flow through the sulfur burner or the temperature of the air flow to the sulfur burner, or both, can be adjusted in response to the sulfur trioxide demand, and the sulfur flow adjusts to maintain a satisfactory operating temperature in the catalytic converter and to supply the demand for sulfur trioxide.

The invention is further illustrated and described by the drawings and following detailed description which present in greater detail the preferred embodiments described above and others that will be apparent to those skilled in the art.

DETAILED DESCRIPTION OF THE INVENTION

Figure 1:
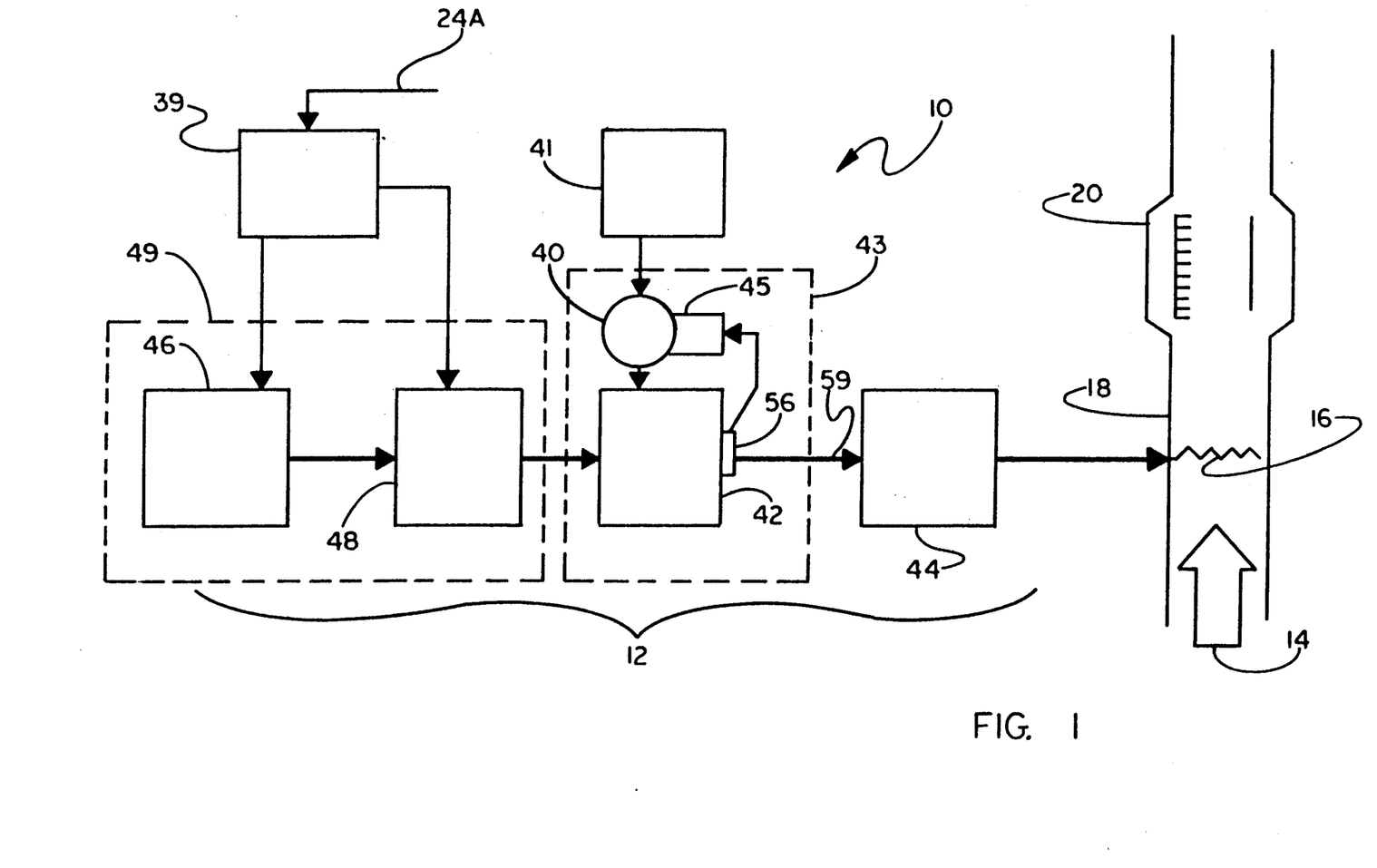
FIG. 1 is a diagrammatic representation of a flue gas conditioning system of the present invention.

FIG. 1 shows a system 10 of the invention, including a conditioning agent production system 12 coupled to conditioning agent injectors 16 which are positioned within duct 18. The conditioning agent production system 12 is operated by a conditioning agent system controller 39. A sulfur source 41 provides a supply of liquified sulfur to sulfur pump 40 which in turn delivers a flow of sulfur from sulfur source 41 to a sulfur burner 42. A catalytic converter 44 converts the products of combustion of sulfur from sulfur burner 42 into sulfur trioxide. The sulfur trioxide from catalytic converter 44 is directed to conditioning agent injectors 16 for introducing sulfur trioxide into boiler flue gas stream 14 for conditioning its entrained particulate matter in preparation for removal by electrostatic precipitator 20.

The system 10 includes a self-contained sulfur burner control loop, encompassed within the dashed line box 43, to maintain a constant temperature supply of sulfur dioxide in air to the catalytic converter 44. The self-contained sulfur burner control loop of FIG. 1 includes temperature sensor means 56 connected with a control 45 for the sulfur pump 40. Temperature sensor means 56 measures the temperature of the sulfur dioxide and air leaving the sulfur burner and provides an output signal if the sulfur dioxide-air mixture departs from a selected desired temperature set point. Control 45 operates the sulfur pump 40 in response to the signal from temperature sensor means 56 to increase the flow of sulfur to the sulfur pump if the temperature of the sulfur dioxide-air mixture leaving the sulfur pump is less than the desired temperature and to decrease the flow of sulfur to the sulfur pump if the temperature of the sulfur dioxide-air mixture leaving the sulfur burner is higher than the desired temperature. Thus, in systems of the invention, the sulfur burner is operated in a simple manner, like many furnaces, to increase or decrease the fuel flow (i.e., sulfur flow) to maintain a desired temperature at its output, or downstream of its output, for example, at the catalytic converter 44. Unlike prior art systems, the sulfur burner pump 40 in systems of the invention is not operated directly in response to a conditioning agent demand signal, and no means is necessary to sense sulfur flow rate. The elimination of sulfur flow sensing means eliminates a significant source of maintenance and unreliability in the gas conditioning system.

Where the heat losses experienced by the sulfur dioxide-air mixture in travelling between the sulfur burner output and the catalytic converter input are predictable, the temperature sensor means 56 is preferably located at the output of the sulfur burner to avoid a conduit installation that may be necessary when the catalytic converter 44 is installed, remotely from the sulfur burner 42. Where the catalytic converter 44 is remote from the sulfur burner 42 and catalytic converter temperature cannot be reliably predicted, temperature sensor means 56 can be located at and operatively associated with the catalytic converter (see, for example, 56A of FIG. 5). In either such arrangement, the self-contained sulfur burner loop can automatically operate to maintain the operating temperature of the catalytic converter 44 within a temperature range for efficient conversion of sulfur dioxide to sulfur trioxide.

In the invention, the sulfur pump of the self-contained sulfur burner control loop also converts sulfur to sulfur dioxide in varying amounts to satisfy the sulfur trioxide demands of the system as a result actions of system controller 39 in response to a conditioning agent demand signal 24A by producing input conditions to sulfur burner 42 that would reduce or increase the temperature of its sulfur dioxide-air output in the absence of the self-contained sulfur burner control loop 43. For example, the conditioning agent production means 12 of FIG. 1 includes a means 46 for providing the sulfur burner 42 with a flow of air and a means 48 for heating the flow of air to the sulfur burner 42. In the simplest method of operation of the system of FIG. 1, this air flow heating means 48 is operated only to bring the sulfur burner 48 up to sulfur burning temperature and is inoperative after sulfur flow is commenced to sulfur burner 42, and controller 39 operates the means 46 for providing the sulfur burner 42 with a flow of air to increase air flow through the sulfur burner in response to a conditioning agent demand signal indicating an increased demand for conditioning agent and to decrease the air flow through the sulfur burner 42 in response to a conditioning agent demand signal indicting a reduced demand for conditioning agent. In the system of the invention, the self-contained sulfur burner control loop 43 will increase the flow of sulfur to the sulfur burner as air flow through the sulfur burner increases and decrease the flow of sulfur to the sulfur burner as air flow through the sulfur burner decreases to maintain the desired output temperature of its sulfur dioxide-air output. Another desirable feature of the system of the invention is that its operation tends to automatically maintain a constant sulfur dioxide-air concentration for delivery to the catalytic converter and permit effective and efficient operation of catalytic converter 44 through a supply of sulfur dioxide in air at a substantially constant concentration and desired temperature.

Means 46 for providing the sulfur burner with a flow of air can be a variable speed blower, a constant flow blower with either an input or an output damper, or any other such means for providing varying flow rates of air.

The turndown ratio of such systems can be extended by operating air heating means 48 at low sulfur flow rates. In addition, in such systems where the air heating means 48 continues to operate, controller 39 can vary the operation of air heating means 48, reducing the heat introduced into the air flow into the sulfur burner 42 if the conditioning agent demand signal indicates an increased demand for conditioning agent and increasing the heat introduced into the air flow into the sulfur burner 42 in the event of a decreased demand for conditioning agent. In addition, both air flow means 46 and air heating means 48 (which combine to provide means for providing the sulfur burner with a flow of heated air 49) can be operated by controller 39 in response to a conditioning agent demand signal. As explained above, in response to such changing inputs to the sulfur burner, the self-contained sulfur burner control loop will vary the sulfur flow into the sulfur burner 42 to maintain the desired temperature of its sulfur dioxide-air output and thereby meet the varying demands for conditioning agent flow.

FIG. 1 has been simplified to clarify the description of the invention. Commercial system will include additional components apparent to those skilled in the art.

Conditioning agent controller 39 is preferably an industrial quality programmable controller capable of storing, loading, and executing program instructions for retrieving input information and controlling output devices. Controller 39 receives at least one load demand signal 24A related to a demand for sulfur trioxide. Preprogrammed instructions stored in controller 39 perform the desired operations on the demand signal input to formulate a desired output for operation of air flow means 46 or air heating means 48, or both. Controller 39 then outputs a signal to either air flow means 46 or air heating means 48, or both, thereby indirectly controlling the sulfur dioxide output of sulfur burner 42. Conditioning agent controller 39 thus responds to conditioning agent demand signals to satisfy a demand for sulfur trioxide and the self-contained sulfur burner control loop 43 maintains automatically the operating temperature of catalytic converter 44 within acceptable limits.

Sulfur source 41 can be either an insulated, steam-heated, steel container or a concrete-lined storage pit placed largely underground and is preferably adapted to contain liquified sulfur. The tank or concrete pit can contain a heater or heat exchanger in intimate contact with the sulfur to liquify the sulfur and to keep the liquified sulfur at the preferred temperature for minimum viscosity and pumping. The heat exchanger with sulfur source 41 may be any heat exchanger suitable for this purpose and may be provided with any source of heat, such as steam, electric, or the output of a suitable oil or gas burner.

Sulfur pump 40 for delivering sulfur from the source 41 to sulfur burner 42 is preferably a positive-displacement pump, such as gear pump or vane pump driven by a variable speed electric motor to deliver a flow of liquified sulfur at a controllable rate. In preferable systems, the positive displacement pump may be immersed within the liquified sulfur to simplify the installation, improve operating characteristics and eliminate pump seal problems. Preferably, sulfur pump 40 will supply a flow of sulfur at rates of, for example, one to five pounds per minute (0.45–2.26 kg/min.) and at a pressure of 60 to 100 pounds per square inch absolute (4218–7030 gm/cm$^2$). Since liquified sulfur is easy to pump, e.g., having a viscosity on the order of water and being non-abrasive, it will be apparent to those skilled in the art that a number of commercially available positive displacement pumps may be used.

Sulfur burner 42 and catalytic converter 44 are the type known to those skilled in the art. The sulfur burner can be the type frequently referred to as a "checker work" or a "cascade burner" or can be an atomizer type. Such sulfur burners are operable preferably in the range of 750° F. to 850° F. (400° C. to 454° C.) to oxidize the liquified sulfur into sulfur dioxide through combustion.

Catalytic converter 44 is a structure and converter well known in the art which is capable of catalytically converting sulfur dioxide to sulfur trioxide through the action of a vanadium pentoxide or other catalyst. Converter 44 contains such catalyst generally applied to the surface of ceramic materials; and as sulfur dioxide passes through the catalytic converter, it is exposed to the catalyst and is converted into sulfur trioxide. It is well known in the art that the catalytic converters preferably operate at a temperature range from about 750° F. to about 1075° F. (399° C. to 579° C.), and preferably at about 850° F. (454° C.). It is also well known in the art that below temperatures of about 750° F. (399° C.) and above temperatures of about 1100° F. (593° C.) such catalytic converters are not efficient in converting sulfur dioxide into sulfur trioxide.

As shown in FIG. 1, such systems also include a forced air supply 46 for providing a flow of air to sulfur burner 42 and catalytic converter 44. The forced air supply 46 may be a commercial air blower known to those skilled in the art. The size of the blower and its electric motor drive will depend on the capacity of conditioning agent production system 12. The air flow from blower 46 is directed through heater 48 and then into sulfur burner 42 for pre-heating the sulfur burner to the combustion temperature of sulfur. Once sulfur flow to sulfur burner 42 begins and combustion occurs, burner start-up heater 48 may be de-energized thereby saving energy as its operation may not be needed in systems of this invention.

Figure 2:
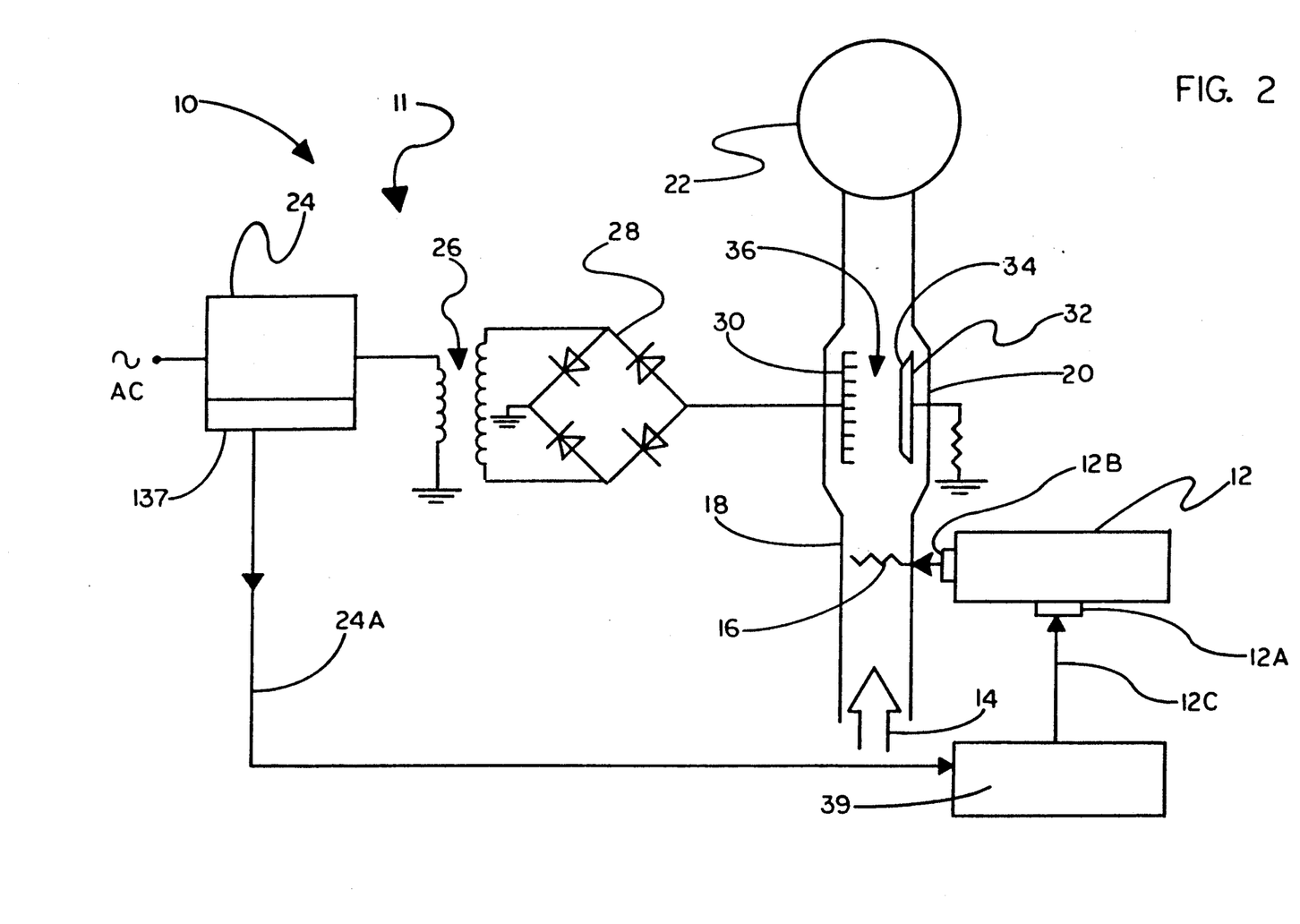
FIG. 2 is another diagrammatic representation of a conditioning agent production system of the present invention.

FIG. 2 is a diagrammatic representation of a system of the invention with a preferred system and method of generating a conditioning agent demand signal 24A. The system 10 includes an electrostatic precipitator system 11 and a conditioning agent production system 12. Electrostatic precipitator system 11 produces an electric field between charging electrode 30 and collection electrode 32 for electrostatically charging entrained particulate matter passing therebetween. Conditioning agent production system 12 introduces a flow of conditioning agent, preferably sulfur trioxide, into a flow of particulate laden boiler flue gas (indicated generally by arrow 14) through injectors 16 positioned within a duct or conduit 18 upstream of an electrostatic precipitator 20 to reduce the resistivity of the particulate matter, thereby aiding the removal of particulate matter from the boiler flue gas prior to its expulsion to the atmosphere from a stack 22. Signals relating to a demand for sulfur trioxide are coupled to conditioning agent system controller 39. Conditioning agent system controller 39 controls the conditioning agent production system 12 to provide a flow of conditioning agent so as to maintain an acceptable particulate matter output from stack 22.

Electrostatic precipitator system 11 includes an electrostatic precipitator controller 24 which supplies an AC output to a high voltage transformer 26. The AC output of high voltage transformer 26 is then converted to DC by rectifier 28. An output of rectifier 28 supplies DC high voltage and current to charging electrode 30. Collection electrode 32 is grounded. The DC voltage and current supplied to charging electrode 30 creates a high voltage electric field between charging electrode 30 and collection electrode 32 which causes corona and an electric discharge current to flow therebetween. The corona discharge current charges the particulate matter of the flue gas passing through the electric field, and the charged particulate matter is then attracted to collection electrode 32.

Figure 3:
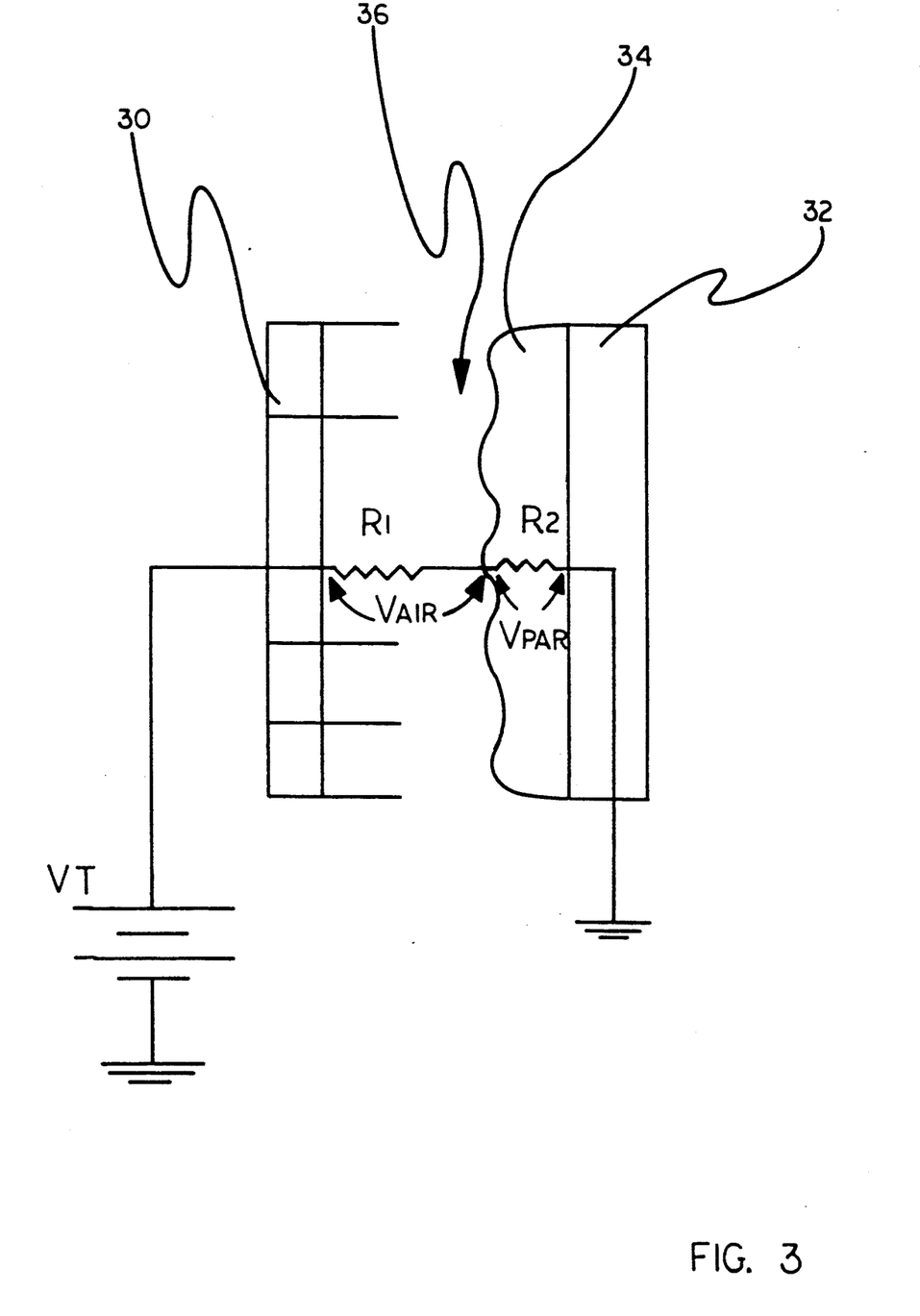
FIG. 3 shows a simplified schematic representation of the electrical characteristics of particle charging in an electrostatic precipitator to help explain the invention.

FIG. 3 depicts a simplified series circuit representation of the electrical relationship between charging electrode 30 and collection electrode 32. R1 represents the resistance of an air gap 36 between charging electrode 30 and an outer surface of collected particulate matter 34 collected on collection electrode 32. R2 represents the resistance of particulate matter 34 accumulated on collection electrode 32. As shown, the total charging electrode voltage (VT) applied to charging electrode 30 is equal to the sum of the effective voltage (Vair) across air gap 36 and the voltage drop (Vpar.) across collected particulate matter 34.

When the resistivity of the collected particulate matter 34 is high, collected particulate matter 34 begins to act like an insulator. As the resistivity of the particulate matter 34 increases, a surface charge develops and the voltage dropped across collected particulate matter 34 increases, thus reducing the effective voltage across the air gap (Vair), i.e., between charging electrode 30 and the outer surface of collected particulate matter 34. A high effective air gap voltage is required to maintain an effective particle changing current, which will drop significantly if the air gap voltage becomes too low. As the surface charge and voltage across the collected particulate matter 34 increase, the dielectric strength of the layer of collected highly resistive particulate matter is exceeded and back ionization occurs. Back ionization substantially reduces the charging and collection of particulate matter and generally indicates the need for more conditioning agent in the flue gas stream to reduce the resistivity of entrained particulate matter.

As indicated above, a prior art Castlet controller detects back ionization by interrupting the AC input to the transformer 26/rectifier 28 set (shown in FIG. 2) at the peak AC (which corresponds to the peak DC voltage on charging electrode 30) and by comparing actual charging electrode voltage decay with a programmed charging electrode voltage decay. The Castlet controller executes pre-programmed instructions to determine the existence of an excessive voltage decay rate of an electrostatic precipitator charging electrode by interrupting the applied charging electrode voltage at its peak, monitoring the decay of the charging electrode voltage and comparing the charging electrode voltage with a programmed voltage after a pre-programmed time. The Castlet controller uses the results of the comparison to determine a frequency of voltage application at which the charging electrodes are recharged. A high number of charging voltage applications per second (high frequency) is intended to produce a relatively high effective voltage between the precipitator charging and collection electrodes (i.e., across the air gap) and corresponds to a lack of back ionization. For example, if the charging application is continuous, i.e., a 60 Hz AC application in a half wave rectifier system or a 120 Hz AC application in a full wave rectifier system, the effective voltage is at a maximum and discharge rate of charging electrodes is low. A low number of charging voltage applications per second (low frequency such as 6 voltage applications per second or 6 Hz) is intended to operate at a lower average voltage to avoid back ionization. Therefore, the frequency of the charging voltage application is indicative of the discharge rate of charging electrodes.

The frequency of voltage applications of a Castlet controller can be used to indicate the resistivity of the flue gas particulate matter collected by the electrostatic precipitator and the need for conditioning agent. In the invention, a method and apparatus are provided to monitor the frequency of application of voltage of a Castlet controller and/or provide a "decay rate signal", preferably in the form of a standard 4-20 milli-ampere or digital control signal, which can be interpreted to indicate the need, or lack of need, for conditioning agent and the flow rate of conditioning agent needed to provide a particulate resistivity for effective particle charging and removal, for precluding back ionization and for maximizing air gap collection voltage.

In a system of the invention shown in FIG. 2, the discharge rate of a charging electrode 30, can be determined by a controller 24, such as a Castlet controller provided with a signal means 37, and the controller and signal means can provide a signal 24A, which will be related to the resistivity of collected particulate matter 34. As explained above, such a signal indicative of the voltage discharge of a precipitator charging electrode can be indicative of the resistivity of the collected particles conditioned and/or unconditioned. A controller 24 adapted to provide an output signal 24A related to discharge rate of charging electrode 30 can provide a signal indicative of the variable that conditioning systems seek to control, the resistivity of the particulate matter. Thus, in the invention, an electrostatic precipitator system 13 including such a signal means 37 can provide a signal 24A based upon the indirect determination of the resistivity of the particulate matter in the flue gas treatment system which can be used to produce a conditioning agent demand signal 24A.

Either controller 24 or controller 39 can be adapted to compare a discharge rate signal with pre-programmed levels indicating the need for and the lack of need for conditioning agent, and adapted between these pre-programmed levels to calculate or to look up, in a programmed look-up table, the operating conditions for air flow means 46 or air heater means 48, or both, that are needed under the indicated conditions of the flue gas treatment system to satisfy a conditioning agent demand.

Figure 4:
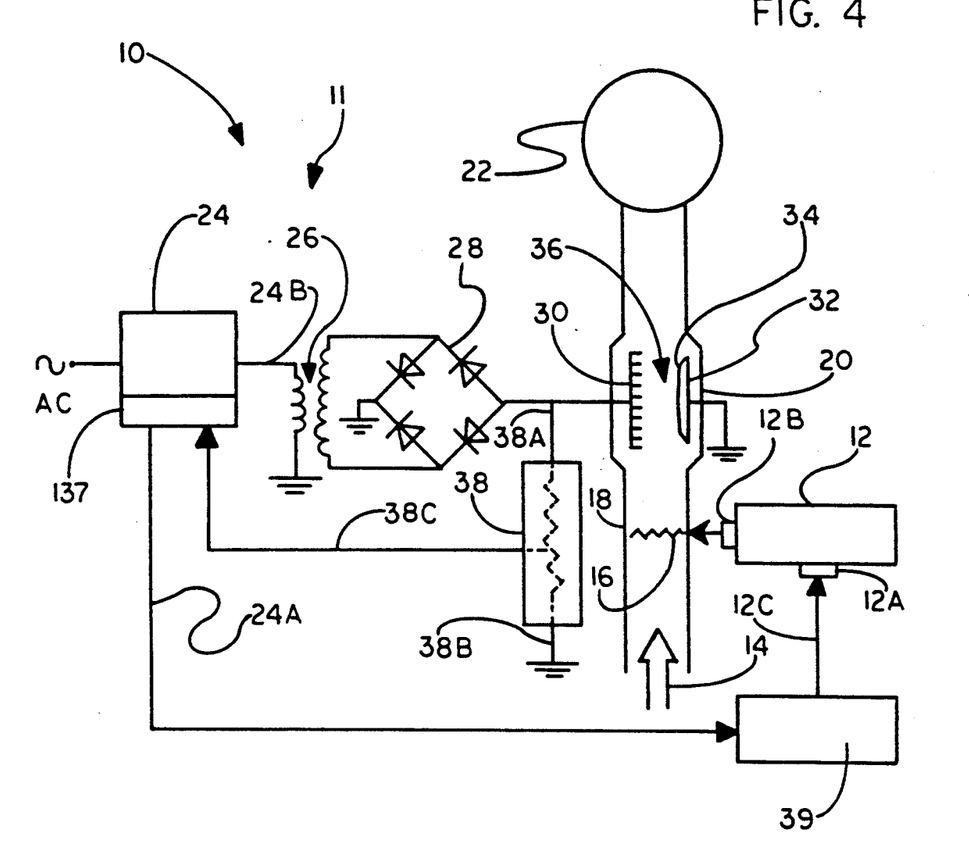
FIG. 4 shows a general diagrammatic representation of a flue gas treatment system of the invention embodying an alternative charging electrode decay rate sensing means.

An alternate means for determining the decay rate of charging electrode 30 is also shown in FIG. 4 and is depicted by dashed lines. Controller 24, like the Castlet controller, is programmed to interrupt the voltage applied to the charged electrodes of the electrostatic precipitator at the peak applied voltage level. A first terminal 38a and a second terminal 38b of a signal means 38, such as a voltage divider, are coupled between an input of changing electrode 30 and ground, respectively. A third terminal 38c of signal means 38 is coupled to a first means 137. The voltage signal from signal means 38 indicates the voltage of charging electrode 30 as a function of time.

Figure 4A:
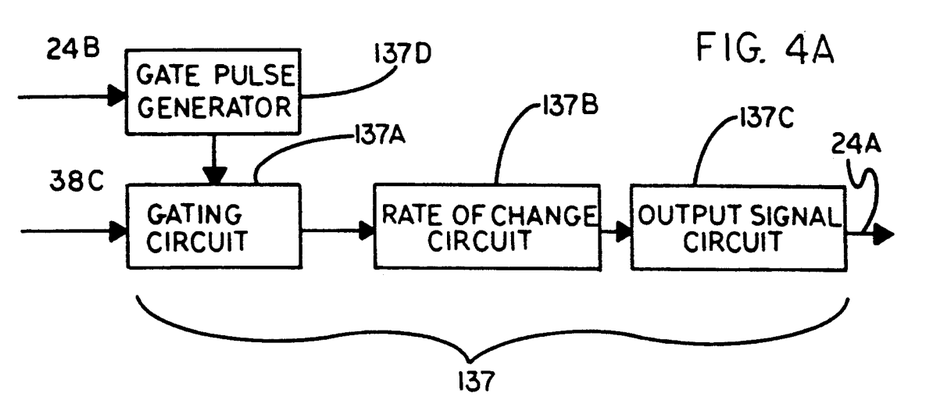
FIG. 4A is a block diagram of the means of FIG. 4 for generating a discharge rate signal.

Controller 24 is thus adapted with first means 137 for generating a signal 24A indicative of the resistivity of the particulate matter in the system. FIG. 4A shows one embodiment of such a means 137. As shown in FIG. 4, the signal 38C from signal means 38 can be directed to an input of a gating circuit 137a. The gating input to gating circuit 137a can be generated by a gate pulse generating circuit connected with the output of controller 24. The gating circuit input is applied as the voltage that is applied to the charged electrodes of the electrostatic precipitator is interrupted, and the gating circuit input is applied to the gating circuit for a predetermined measurement period, or until voltage is again applied to the electrostatic precipitator electrodes. During the gating period, with no voltage applied to the charging electrodes, the signal from signal means 38C is passed by the gating circuit to a voltage rate of change circuit 137b (such as a differentiator circuit or a circuit which compares the voltage signal with a programmed voltage after a programmed time). The voltage rate of change circuit 137b provides a voltage rate of change output (i.e., electrode voltage discharge rate) to an output signal circuit 137c. Output signal circuit 137c may use the output from the rate of change circuit 137b and provide either an analog or a digital output signal that may be converted to a conditioning agent demand signal by either the controller 24 or system controller means 39. In preferred systems of the invention, however, a signal 24A indicative of the resistivity of the particulate matter and the need for conditioning agent is provided to the system controller 39, which determines the operation of sulfur trioxide production means 12.

Other conditioning agent demand signals such as signals indicating the quantity of coal burned, the opacity of the flue gas effluent and/or the precipitator power can also be supplied to system controller means 39 if advisable.

Figure 5:
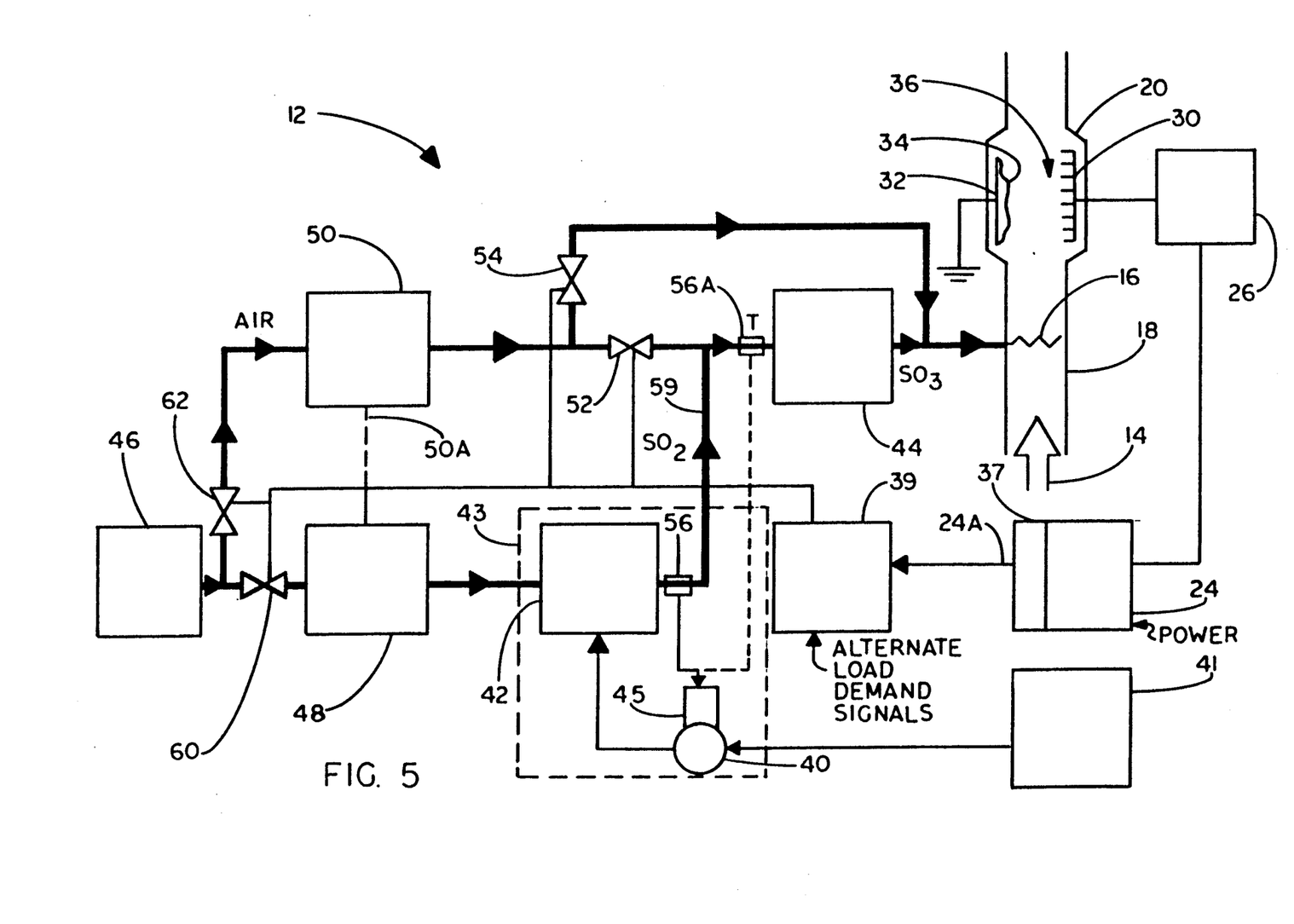
FIG. 5 is a diagrammatic representation of a preferred condition agent production system of the present invention.

FIG. 5 is a diagrammatic drawing of a preferred system of the invention including components to provide a bypass air flow path for a portion of the air flow from air flow means 46 around the air heater 48 and sulfur burner 42, and both through and around the catalytic converter 44. The control of the portions of the air flow from air flow means 46 that are directed through the sulfur burner 42 and through the bypass air flow path is effected by operation of valve means 60 and 62 by the system controller 39. The control of the air portion in the bypass air flow path to direct it either through the catalytic converter 44 or around the catalytic converter or both, is effected by operation of valve means 52 and 54 by the system controller 39.

The system of FIG. 5, like the system illustrated in FIG. 1 includes a self-contained sulfur burner control loop (within dashed box 43) which operates to maintain a flow of sulfur dioxide in air at a substantially constant concentration and at the desired temperature for effective conversion of the sulfur dioxide to sulfur trioxide. In the system of FIG. 5, system controller 39 receives a conditioning agent demand signal 24A from a means 37 for determining the discharge rate of the charged electrodes 30 of electrostatic precipitator 20 in the manner described above, and controller 39 determines, from the conditioning agent demand signal 24A, operating conditions for valve means 60 and/or air heater 48 to provide input conditions to sulfur burner 42 that result in a sulfur flow into the sulfur burner 42 and a production therein of sulfur dioxide that provides a satisfactory flow of sulfur trioxide in response to the demand for conditioning agent.

In the system of FIG. 5, blower 46 also supplies a flow of air, controlled by valve 62 and controller 39 through converter air heater 50 to pre-heat catalytic converter 44 to a preferred temperature range of 750° to 1000° for conversion of sulfur dioxide into sulfur trioxide. Once the catalytic converter 44 reaches its operating temperature and sulfur flow is initiated to sulfur burner 42, valve 52 is closed and valve 54 is opened thereby diverting the air flowing through converter air heater 50 around catalytic converter 44 to be mixed with the sulfur trioxide-air mixture leaving catalytic converter 44 to maintain a relatively constant rate of gas flow through the injectors 16 that direct sulfur trioxide into flue gas stream 14.

In a preferred method of this invention, air is supplied through the heater 48 from blower 46 to pre-heat the sulfur burner 42 to the combustion temperature of sulfur and there is no bypass air flowing. System controller 39 then applies power to the sulfur pump 40 and initiates a flow of liquid sulfur through the sulfur burner 42 and at the same time de-energizes the heater 48. The heat generated from the sulfur combustion continues to ignite the flow of sulfur as it arrives in sulfur burner 42. Air flow through sulfur burner 42 is adjusted in response to the sulfur trioxide demand by operating the means for providing a flow of air to the sulfur burner (for example, valve means 60 in FIG. 5) with controller 39, and sulfur flow adjusts through the action of the self-contained sulfur burner control loop 43 and satisfies the demand from sulfur trioxide. As indicated above, air flow into the sulfur burner 42 is related to sulfur trioxide demand.

In another method of the invention, all of a constant air flow enters the heater 48 and there is no bypass air flowing. Temperature at the outlet of the heater 48 is controlled by the sulfur trioxide demand. Temperature at the output of heater 48 is inversely related to demand. That is, at maximum sulfur trioxide demand, the temperature setpoint at the outlet of heater 48 is minimum. At minimum demand sulfur trioxide, the temperature setpoint of heater 48 is maximum. Temperature into the converter 44 is controlled by the adjustment of the sulfur flow rate by the self-contained sulfur burner control loop 43 to maintain a constant temperature at the output of the sulfur burner and the input to the converter 44.

In preferred embodiments of the invention, system controller 39 controls the rate of flow of sulfur trioxide from signal means 37 generating a sulfur trioxide demand signal 24A, preferably from a signal relating to the voltage decay rate of an electrostatic precipitator charging electrode 30, as illustrated and described above. Controller 39 is provided with sulfur trioxide demand 24A and may be provided with other signals such as the rate of coal consumption, the flue gas opacity, and precipitator power consumption.

In another method of operation of the system of FIG. 5, the bypass air flow through catalytic converter heater 50 is not totally diverted around the catalytic converter 44 by valves 52 and 54, but a portion of the heated air flow from catalytic converter heater 50 is directed through the catalytic converter 44, and the catalytic converter heater 44 is operated by controller 39 over a control connection (shown as dashed line 50A in FIG. 5) to maintain the catalytic converter operating temperature within a desirable range. In such operations, the system of FIG. 5 is provided with the temperature sensor 56A at the inlet of catalytic converter 44. In this method, the temperature setpoint at the discharge of the bypass heater 50 is varied inversely with sulfur trioxide demand. At maximum $SO_3$ demand, the temperature will be at the minimum setting and at minimum $SO_3$ demand, the temperature setpoint will be at the maximum setting. Where heated bypass air from heater 50 is introduced ahead of the converter 44, it will be introduced ahead of the converter inlet temperature sensor 56A. As before, control of the converter inlet temperature occurs by adjustment of the sulfur flow rate, which in the system of the invention, also meets the demand for conditioning agent.

In still another method of the invention, the temperatures at the outlets of the sulfur burner and bypass heaters, 48 and 50 respectively, and air flow through the sulfur furnace and in the bypass path are controlled by the conditioning demand signal from controller 59. Minimum flow limits are placed on air flows, and the sulfur burner and bypass burner output temperatures are adjusted to compensate. In the system, sulfur flow varies to maintain a substantially constant converter temperature.

In each of the methods of invention, there is no need to measure sulfur flow. Measuring devices for sulfur flow are expensive and in many cases require frequent maintenance. Proper sulfur flow can be determined by the stable control of the converter temperature. Failure of sulfur flow will be quickly detected. A low temperature at the converter will show flow failure. Prior art systems control sulfur burner discharge and converter inlet temperatures by adjusting heat input ahead of the sulfur burner. In such systems, these temperatures will be at setpoint regardless of sulfur flow. Hence pump failure will not be detected until discovered by operator monitoring or by improper precipitator operation caused by loss of conditioning.

In one preferred embodiment of FIG. 5, sulfur burner 42 and catalytic converter 44 are located remote in relation to one another to allow for their convenient placement. For example, sulfur burner 42 may be located at ground level near sulfur source 41 and sulfur pump 40. Catalytic converter 44 can be conveniently mounted in an elevated location adjacent to flue duct 18. In such an arrangement, sulfur burner 42 and catalytic converter 44 are coupled by a thermally insulated delivery conduit 59, and the sulfur dioxide-air mixture produced in sulfur burner 42 is transferred via insulated delivery conduit 59 to catalytic converter 44 for conversion into sulfur trioxide. In such embodiments, a trim signal which relates to the temperature of catalytic converter 44 can be calculated based upon the temperature of the sulfur dioxide-air mixture exiting sulfur burner 42. A temperature sensor 56 mounted near an output of sulfur burner 42 supplies a temperature signal related to the temperature of sulfur burner 42. The temperature of the sulfur dioxide-air mixture exiting sulfur burner 42 will be higher than the temperature of the sulfur dioxide-air mixture entering catalytic converter 44 because of thermal losses in conduit 59. However, the temperature of catalytic converter 44 can be determined by system controller 39 because the thermal losses in conduit 59 can be calculated. System controller 39 may calculate with acceptable accuracy the catalytic converter temperature and provide a trim signal based upon the output temperature and flow rate of sulfur burner 42, values related to, for example, the thermal dissipation of delivery conduit 59 and the applicable ambient temperature and pre-programmed algorithms for thermal losses from conduit 59. System controller 39 can use the calculated trim value in conjunction with one or more sulfur trioxide demand signals to adjust the input condition to the sulfur burner 42 and maintain the operating temperature of catalytic converter 44 within a desirable operating temperature range.

Thus, as indicated above, in the invention, a conditioning agent system comprises means 40, such as a pump providing liquid sulfur to a sulfur burner 42 to maintain a substantially constant temperature at the output of the sulfur burner 42 and/or at the input of a catalytic converter 44. In the invention, the air flow and/or heat input to the sulfur burner 42 is varied in response to the demand for sulfur trioxide conditioning agent, and as the sulfur pump adjusts sulfur flow rate to maintain the constant desired temperature, the sulfur burner 42 provides a varied flow of sulfur dioxide, and thus a varied flow of sulfur trioxide into the boiler flue gas in response to demand where it conditions entrained particles for removal by electrostatic precipitator 20.

In a preferred method of implementing this invention by the system of FIG. 5, air supplied from blower 46 is supplied through the sulfur burner start-up heater 48 to pre-heat the sulfur burner 42 to the combustion temperature of sulfur. Air is also supplied through catalytic converter air heater 50 to pre-heat the catalytic converter to a temperature range of between 750° F. and 1000° F. System controller 39 coupled to sulfur pump 40 initiates a flow of liquid sulfur through the sulfur burner 42 in proportion to one or more sulfur trioxide demand signals, at which time the sulfur burner start-up heater 48 is de-energized. The heat generated from the sulfur combustion continues to ignite the flow of sulfur as it arrives in sulfur burner 42. Once the flow of liquified sulfur has begun, the air flow from blower 46 through catalytic converter air heater 50 is diverted around the catalytic converter, and mixed with the sulfur trioxide at the output of catalytic converter 44. The air flow is then adjusted through sulfur burner 42 in proportion to the sulfur trioxide demand by operating valves 60 and 62 with controller 39 to vary the air flow through the sulfur burner 42 while maintaining a relatively constant flow of $SO_3$ and air through the injectors 16. The sulfur flow is adjusted by the self-contained sulfur burner control loop 43 to maintain a satisfactory operating temperature in catalytic converter 44 and meet the sulfur trioxide demand.

In such a preferred method for implementing this invention, a discharge rate of a charging electrode 30 of electrostatic precipitator system 11 can be determined by signal means 38 as shown in FIG. 4 and described above, and a sulfur trioxide demand signal is generated by signal means 37 which relates the charging electrode discharge rate to a demand for sulfur trioxide. The demand signal is used by system controller 39 to adjust the flow of sulfur trioxide in the system.

In one variation of the method of operation of the system of FIG. 5, heated air from catalytic converter heater 50 is not entirely diverted around the catalytic converter 44 and the temperature at the discharge of catalytic converter heater 50 is reduced inversely with sulfur trioxide demand when the demand for sulfur trioxide is high. This method offers energy savings by reducing the heat to converter air heater 50 at times of high sulfur trioxide demand.

Another variation of an operating method of the system of FIG. 5 includes varying the temperature setpoint of the sulfur pump control 45 with controller 39 as the demand for conditioning agent varies to provide in improved control of the catalytic converter operating temperature. Where the conditioning agent demand signal is used by controller 39 to vary the operation of heater 48 and the temperature of the air flow into sulfur burner 42, variation of sulfur flow rate to maintain the sulfur burner output temperature or catalytic converter input temperature substantially constant will vary the concentration of sulfur dioxide in air and may require adjustment of the desired temperature output of the sulfur burner for more effective conversion of sulfur dioxide to sulfur trioxide. For example, as the sulfur trioxide demand increases, sulfur pump 42, in response to a decreased input temperature, increases the flow of liquified sulfur to sulfur burner 42, thus "richening" the air/sulfur mixture burned, and the concentration of sulfur dioxide air mixture leaving the sulfur burner and entering the catalytic converter 44, where the conversion of the increased concentration of sulfur dioxide may elevate the catalytic converter 44 beyond its desirable range as a result of the exothermic conversion reaction.

Still another variation of the operating methods of the system of FIG. 5 includes varying the temperatures at the outlet of sulfur burner start-up heater 48 and catalytic converter air heater 50 and varying the air flow through both the sulfur burner 42 and converter air heater 50 based upon the demand for sulfur trioxide.

Systems of the invention, including the methods and apparatus are capable of an effective supply of sulfur trioxide for conditioning flue gas prior to its passage through an electrostatic precipitator. Sulfur flow need not be measured and proper flow can be determined from a stable control of the catalytic converter temperature. Therefore, expensive measuring devices for determining sulfur flow which often require frequent maintenance are thereby eliminated. Furthermore, failure of sulfur flow can be detected quickly since a low temperature at the catalytic converter will indicate sulfur flow failure. Therefore, the invention provides an improved and simplified apparatus and method for effectively supplying sulfur trioxide for conditioning boiler flue gas or demand while maintaining the operating temperature of the catalytic converter within acceptable limits.

While preferred embodiments and of the present invention are described above, those skilled in the art will recognize that other embodiments are possible without departing from the scope of the following claims.

What is claimed is:

1. An apparatus for conditioning flue gas with sulfur trioxide for removal of entrained particles with an electrostatic precipitator, comprising:
   means for providing a flow of sulfur dioxide gas in air at a desired temperature, including a sulfur burner, means for providing said sulfur burner with a flow of air, and means for providing said sulfur burner with a flow of sulfur; temperature sensor means for said flow of sulfur dioxide in air, and a control for said means for providing said sulfur burner with a flow of sulfur responding to said temperature sensor means to provide said flow of sulfur dioxide in air at said desired temperature;

catalytic converter means for converting sulfur dioxide to sulfur trioxide;

sulfur trioxide input means for providing a signal corresponding to a demand for sulfur trioxide; and a controller connected with said means for providing the sulfur burner with a flow of air and with said sulfur demand input means, said controller being programmed to operate said means for providing air flow to said sulfur burner to vary said air flow in response to said sulfur trioxide input signal and meet the demand for sulfur trioxide.

2. The apparatus of claim 1 and further comprising a sulfur burner start-up heater to raise the temperature of said sulfur burner to a combustion point of said sulfur prior to sulfur flow.

3. The apparatus of claim 2 wherein said sulfur burner start-up heater is de-energized when sulfur flow begins.

4. The apparatus of claim 1 further comprising a catalytic converter heater to raise the temperature of said catalytic converter means to a desired temperature prior to sulfur flow.

5. The apparatus of claim 1 wherein said desired temperature in the range of about 750° F. to about 1000° F.

6. The apparatus of claim 4 wherein said catalytic converter heater is an air heater provided with a flow of forced air, and said catalytic converter means is heated with forced air.

7. The apparatus of claim 6 wherein at least a portion of said forced air bypasses said catalytic converter means and mixes with sulfur trioxide at an output of said catalytic converter means when sulfur flow begins.

8. The apparatus of claim 1 wherein said sulfur trioxide input means comprises:

means for sensing a discharge rate of a charging electrode and generating a sulfur trioxide demand signal.

9. The apparatus of claim 8 wherein said means further comprises precipitator control means for controlling and interrupting power to said precipitator charging electrode and said precipitator control means interrupts power to said charging electrode to sense said discharge rate of said charging electrode.

10. The apparatus of claim 1 further comprising means for heating said flow of air to said sulfur burner connected with said controller, said controller being programmed to operate additionally said means for heating said flow of air to said sulfur burner and meet the demand for sulfur trioxide.

11. The apparatus of claim 8 wherein said apparatus provides a flow of said conditioning agent to maintain said discharge rate within predefined limits.

12. The apparatus of claim 8 wherein said means comprises a voltage sensing circuit connected with said charging electrode and with said means for sensing a discharge rate of the charging electrode and generating a sulfur trioxide demand signal.

13. The apparatus of claim 1 wherein said temperature sensor means is located at the output of said means for providing a flow of sulfur dioxide and air at a desired temperature.

14. The apparatus of claim 1 wherein said temperature sensor means is located at the input of said catalytic converter.

15. The system of claim 1 wherein said controller is connected with said temperature sensor means and operates said temperature sensor means to vary the desired temperature in response to the sulfur trioxide input signal.

16. A system for conditioning flue gas with sulfur trioxide for removal of entrained particles with an electrostatic precipitator, comprising:

means for providing a flow of sulfur dioxide in air at a desired temperature, including a sulfur burner, a pump for liquified sulfur, means for providing a heated flow of air to said sulfur burner, a temperature sensor for flow of sulfur dioxide in air and a control connected with said temperature sensor and said sulfur pump to vary the operation of said sulfur pump and maintain the flow of sulfur dioxide in air at a setpoint corresponding to the desired temperature;

catalytic converter means for converting sulfur dioxide to sulfur trioxide;

means for generating a sulfur trioxide demand signal; and a controller connected with said means for generating a sulfur trioxide demand signal and said means for providing a heated flow of air to said sulfur burner, said controller operating said means for providing a heated flow of air to said sulfur burner in response to a sulfur trioxide demand signal to provide cooling inputs to said sulfur burner for increased sulfur trioxide flows and heating inputs to said sulfur burner for decreased sulfur trioxide flows.

17. The system of claim 16 wherein said means for providing a heated flow of air to said sulfur burner comprises an air flow heater, and said controller operates said air flow heater to provide a reduced temperature air flow into the sulfur burner in response to a demand for increased flow of sulfur trioxide and an increased temperature air flow into the sulfur burner in response to a demand for a decreased flow of sulfur trioxide.

18. The system of claim 17 wherein said controller varies the desired temperature setpoint of the control for the sulfur pump as the demand for sulfur trioxide conditioning agent varies.

19. A method for conditioning flue gas with sulfur trioxide for removal of entrained particles with an electrostatic precipitator, comprising the steps of:

supplying air through a sulfur burner start-up heater to pre-heat a sulfur burner to the combustion temperature of sulfur;

initiating a flow of liquid sulfur to said sulfur burner in proportion to a sulfur trioxide demand signal to provide a flow of sulfur dioxide to a catalytic converter for conversion to sulfur trioxide;

de-energizing the sulfur burner start-up heater;

adjusting air flow through the sulfur burner in response to the sulfur trioxide demand; and adjusting the sulfur flow to maintain a satisfactory operating temperature in said catalytic converter.

20. The method of claim 19 further comprising the steps of:

supplying air through a catalytic converter heater to pre-heat the catalytic converter to a temperature range of 750° F. and 1000° F.; and diverting said air flow from said catalytic converter heater around said catalytic converter upon the initiation of the flow of liquid sulfur.

21. The method of claim 19 and further comprising the step of:

supplying air through a catalytic converter heater to the catalytic converter; and varying the temperature at the discharge of the catalytic converter heater inversely with sulfur trioxide demand.

22. The method of claim 20 and further comprising the step of:

varying temperature at the outlet of the catalytic converter heater and varying air flow through the sulfur burner and the converter heater based upon the demand for sulfur trioxide.

23. In a method for conditioning flue gas with sulfur trioxide for removal of entrained particles with an electrostatic precipitator in which flows of air and sulfur are supplied to a sulfur burner for combustion to create a flow of sulfur dioxide and air from the sulfur burner directed to a catalytic converter for conversion to a sulfur trioxide conditioning agent, the improvement comprising the steps providing a sulfur trioxide demand signal;

adjusting the air flow to the sulfur burner in response to the sulfur trioxide demand signal;

sensing a temperature of the flow of sulfur dioxide and air from the sulfur burner; and adjusting the sulfur flow to the sulfur burner to maintain the temperature of the flow of sulfur dioxide from the sulfur burner to provide an effective operating temperature range of the catalytic converter and a demanded flow of sulfur trioxide.

24. In a method for conditioning flue gas with sulfur trioxide for removal of entrained particles with an electrostatic precipitator in which flows of heated air and sulfur are supplied to a sulfur burner for combustion to create a flow of sulfur dioxide and air directed to a catalytic converter for conversion to a sulfur trioxide conditioning agent, the improvement comprising the steps of:

providing a sulfur trioxide demand signal;

adjusting the temperature of the air flow to the sulfur burner in response to the sulfur trioxide demand signal;

sensing a temperature of the flow of sulfur dioxide and air from the sulfur burner; and adjusting the sulfur flow to the sulfur burner to maintain the temperature of the flow of sulfur dioxide from the sulfur burner to provide an effective operating temperature of the catalytic converter and a demanded flow of sulfur trioxide.

25. A method for conditioning flue gas with conditioning agent for removal of entrained particles with an electrostatic precipitator having at least one charging electrode intermittently charged and discharged and at least one collection electrode, comprising the steps of:

determining a discharge rate of said charged electrode;

generating a discharge rate signal relating to said discharge rate;

generating a sulfur trioxide demand signal from said discharge rate signal to provide for a flow of sulfur trioxide for conditioning flue gas;

supplying air through a sulfur burner start-up heater to pre-heat a sulfur burner to the combustion temperature of sulfur;

supplying air through a catalytic converter heater to pre-heat catalytic converter to a temperature range of 750° F. and 1000° F.;

initiating a flow of liquid sulfur to said sulfur burner in response to the sulfur trioxide demand signal to provide a flow of sulfur dioxide to the catalytic converter for conversion to sulfur trioxide;

de-energizing the sulfur burner start-up heater upon initiation of sulfur flow;

diverting said air flow from said catalytic converter heater around said catalytic converter upon initiation of sulfur flow;

determining a desired temperature for said flow of sulfur dioxide to the catalytic converter;

determining the temperature of the flow of sulfur dioxide;

adjusting air flow through the sulfur burner in response to the sulfur trioxide demand; and adjusting the sulfur flow to maintain said flow of sulfur dioxide within acceptable limits for said desired temperature.

26. The method of claim 25 further comprising the steps of adjusting sulfur flow to maintain a satisfactory operating temperature of said catalytic converter.

27. The method of claim 26 wherein the operating temperature of the catalytic converter is determined by measuring the temperature of the flow of sulfur dioxide leaving the sulfur burner and determining a temperature differential and determining the temperature of the catalytic converter.

28. A flue gas conditioning system for controlling the flow of conditioning agent for removal of conditioned entrained particles in the flue gas with an electrostatic precipitator having at least one charging electrode and at least one collection electrode, comprising:

signal means for providing a decay rate signal related to a discharge rate of said charged electrode after current supplied to said charged electrode is interrupted;

means for providing a flow of sulfur dioxide gas in air at a desirable temperature, including a sulfur burner, means for providing said sulfur burner with a flow of air, and means for providing said sulfur burner with a flow of sulfur;

catalytic converter means for converting sulfur dioxide to sulfur trioxide;

temperature sensor means for the flow of sulfur dioxide and air from said sulfur burner to said catalytic converter means;

sulfur trioxide demand input means coupled to said decay rate signal for providing a signal corresponding to a demand for sulfur trioxide; and a controller coupled to said means for providing the sulfur burner with a flow of air and to said sulfur trioxide demand input means, said controller being programmed to operate said means for providing said sulfur burner with a flow of air to vary the sulfur burner input conditions in response to said decay rate signal and operating temperature of said catalytic converter means.

29. The apparatus of claim 28 wherein said means for providing said sulfur burner with a flow of air includes an air heater, said controller varies the temperature of the air flowing into the sulfur burner, and controller adjusts said desirable temperature in response to said decay rate signal to control the temperature of operation of the catalytic converter.

30. A method for conditioning flue gas with sulfur trioxide for removal of entrained particles with an electrostatic precipitator, comprising the steps of:

supplying air through a sulfur burner start-up heater to pre-heat a sulfur burner to the combustion temperature of sulfur;

supplying air through a catalytic converter start-up heater to pre-heat catalytic converter means to a temperature range of 750° and 1000°;
initiating a flow of liquid sulfur to said sulfur burner;
de-energizing the sulfur burner start-up heater;
diverting said air flow from said catalytic start-up heater around said catalytic converter means;
providing a sulfur trioxide demand signal;
adjusting air flow through the sulfur burner in response to the sulfur trioxide demand signal;
adjusting the sulfur flow to maintain a satisfactory operating temperature in said catalytic converter means and satisfy the sulfur trioxide demand signal.

31. The method of claim 30 and further comprising the step of:
maintaining a heated flow of air from said catalytic start-up heater through said catalytic converter; and
varying the temperature at the discharge of the converter start-up heater inversely with sulfur trioxide demand.

32. The method of claim 31 and further comprising the step of:
varying temperatures at the outlets of the sulfur burner start-up heater and the catalytic converter start-up heater and air flow through the sulfur burner and the converter start-up heater based upon the demand for sulfur trioxide.

* * * * *

UNITED STATES PATENT AND TRADEMARK OFFICE
CERTIFICATE OF CORRECTION

PATENT NO. : 5,288,303

DATED : February 22, 1994

INVENTOR(S) : David L. Woracek, et al.

It is certified that error appears in the above-indentified patent and that said Letters Patent is hereby corrected as shown below:

In Col. 1, line 35, after "its", insert a space before "resistivity".

In Col. 7, line 59, delete "indicting" and insert therefor --indicating--.

In Col. 8, line 33, delete "system" and insert therefor --systems--.

In Col. 8, line 67, after "such as" insert --a--.

In Col. 13, line 13, after "750°" insert --F.--; after "1000°" insert --F.--.

In Col. 13, line 38, delete "from" and insert therefor --for--.

In Col. 14, line 2, after "heater" delete "44" and insert therefor --50--.

UNITED STATES PATENT AND TRADEMARK OFFICE
CERTIFICATE OF CORRECTION

PATENT NO. : 5,288,303

DATED : February 22, 1994

INVENTOR(S) : David L. Woracek, et al.

It is certified that error appears in the above-indentified patent and that said Letters Patent is hereby corrected as shown below:

In Col. 14, line 30, after "methods of" insert --the--.

In Col. 14, line 40, after "Hence" insert --,-- (a comma).

In Col. 16, line 8, after "provide", delete "in" and insert therefor --an--.

In Col. 16, line 52, after "embodiments", delete "and".

In Col. 17, line 25, after "temperature", insert --is--.

In Col. 18, line 68, delete "step" and insert therefor --steps--.

In Col. 21, line 4, after "750°", insert --F.--; after "1000°", insert --F.--.

UNITED STATES PATENT AND TRADEMARK OFFICE
CERTIFICATE OF CORRECTION

PATENT NO. : 5,288,303
DATED : February 22, 1994
INVENTOR(S) : David L. Woracek, et al.

It is certified that error appears in the above-indentified patent and that said Letters Patent is hereby corrected as shown below:

In col. 22, line 2, delete "step" and insert therefor --steps--.

Signed and Sealed this

Tenth Day of June, 1997

Attest:

BRUCE LEHMAN

Attesting Officer

Commissioner of Patents and Trademarks